(No Model.)

R. W. THOMPSON.
ICE CUTTING TROLLEY.

No. 518,015. Patented Apr. 10, 1894.

Witnesses
Inventor
Robert W. Thompson
by
Wm. M. Monroe.
Attorney

UNITED STATES PATENT OFFICE.

ROBERT W. THOMPSON, OF CLEVELAND, OHIO.

ICE-CUTTING TROLLEY.

SPECIFICATION forming part of Letters Patent No. 518,015, dated April 10, 1894.

Application filed November 4, 1893. Serial No. 490,051. (No model.)

*To all whom it may concern:*

Be it known that I, ROBERT W. THOMPSON, a citizen of the United States, and a resident of Cleveland, county of Cuyahoga, State of Ohio, have invented certain new and useful Improvements in Trolleys, of which I hereby declare the following to be a full, clear, and exact description, such as will enable others skilled in the art to which it appertains to make and use the same.

My invention relates to improvements in trolley railway systems, and the object of the invention is to provide means for removing accumulations of ice or snow from the trolley wire in advance of the trolley wheel, so that complete and continuous contact may be made by the trolley with the wire as it passes. I accomplish this object by means of a trolley wheel provided with concentric cutting rings, at the periphery, with the arrangement of parts and details of construction as hereinafter described, shown in the accompanying drawings and more specifically pointed out in the claims.

Figure 1:
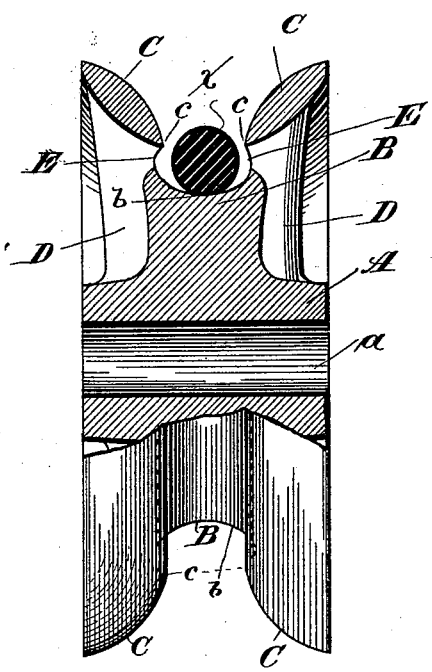
Figure 2:
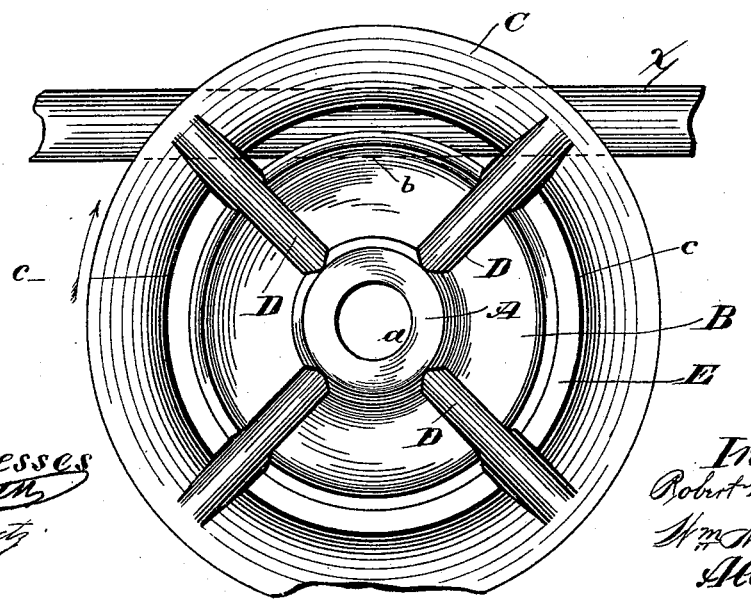

In the accompanying drawings, Figure 1 is a vertical elevation (with the upper portion in section) of the face of the trolley wheel. Fig. 2 is a side view of the wheel.

In the figures A is the hub perforated for the shaft at $a$, B is a central disk integral therewith, provided with the groove $b$ similar in outline to the bottom of the V grooves of trolleys in common use. The upper portions of the V of the groove are formed of rings C separated by the annular openings E from the central disk. These rings are preferably of flattened elliptical section their lower and inner edges being sharpened to an acute cutting angle, as shown at $c$ these inner edges being nearly or precisely on the same vertical plane as the edges of the inner groove.

X represents the wire.

In operation when the trolley is traversing the wire the inner edges of the rings will scrape away any accumulation upon the wire before the central portion $b$ is in contact with the wire, thus preventing the wedging of dirt, &c., or other insulating material between the trolley and wire.

To further facilitate the escape of all loose material between the trolley and wire, the annular openings E are left on either side, arms D connecting the rings C with the hub. An additional advantage is found in the air circulation through the openings E.

I do not claim the exact size of wheel and rings, or openings E, nor the exact width of the groove, or distance between the rings, but,

What I claim as new, and desire to secure by Letters Patent, is—

1. In a combined trolley wheel and wire stripper, the combination of a hub provided with a central disk grooved on its edge, peripheral rings secured by radial arms to the disk and hub at either side of the disk but separated therefrom by annular openings, and cutting inner edges integral with the rings, substantially as described.

2. In a combined trolley and wire stripper, the combination of a centrally perforated hub provided with a grooved disk, and concentric peripheral rings completing the sides of the groove, substantially as described.

3. In a trolley wheel, the combination of a hub provided with a central disk grooved to conform to the shape of the bottom of the trolley V shaped groove, concentric peripheral rings of flattened elliptical section diagonally placed to form the sides of the V shaped groove, but separated from the bottom by annular openings, and radial arms, connecting the said rings with the central disk and hub, substantially as described.

4. In a trolley wheel, the combination with a hub and grooved disk, of concentric rings forming the sides of the grooves provided with annular cutting edges, substantially as described.

ROBERT W. THOMPSON.

Witnesses:
WM. M. MONROE,
M. F. GOETZ.